US 8,110,300 B2
Feb. 7, 2012

(12) United States Patent
Niedzwiecki et al.

(10) Patent No.: US 8,110,300 B2
(45) Date of Patent: Feb. 7, 2012

(54) BATTERY MOUNTING SYSTEM

(75) Inventors: Mark Niedzwiecki, Troy, MI (US);
Martin J. Klein, Grosse Pointe Park, MI (US); William Koetting, Davisburg, MI (US)

(73) Assignee: LG Chem, Ltd. (KR)

( * ) Notice: Subject to any disclaimer, the term of this patent is extended or adjusted under 35 U.S.C. 154(b) by 801 days.

(21) Appl. No.: 12/165,298

(22) Filed: Jun. 30, 2008

(65) Prior Publication Data
US 2009/0325049 A1 Dec. 31, 2009

(51) Int. Cl.
*H01M 2/10* (2006.01)
*H01M 10/02* (2006.01)
*B60R 16/04* (2006.01)

(52) U.S. Cl. .......... 429/96; 429/100; 429/149; 429/153

(58) Field of Classification Search .............. 429/96, 429/100, 149, 152–155, 163; 180/68.5
See application file for complete search history.

(56) References Cited

U.S. PATENT DOCUMENTS

| | | | | |
|---|---|---|---|---|
| 2,933,548 A | * | 4/1960 | Walker | 429/100 |
| 3,866,704 A | * | 2/1975 | Bowers et al. | 180/68.5 |
| 4,936,409 A | * | 6/1990 | Nix et al. | 180/68.5 |
| 5,378,555 A | * | 1/1995 | Waters et al. | 429/97 |
| 5,558,949 A | * | 9/1996 | Iwatsuki et al. | 429/99 |
| 6,230,834 B1 | * | 5/2001 | Van Hout et al. | 180/68.5 |
| 6,648,090 B2 | * | 11/2003 | Iwase | 180/68.5 |
| 2006/0218823 A1 | * | 10/2006 | Olmr et al. | 37/244 |
| 2009/0044997 A1 | * | 2/2009 | Picavet | 180/68.5 |
| 2009/0166116 A1 | * | 7/2009 | Kiya et al. | 180/68.5 |

FOREIGN PATENT DOCUMENTS

WO   WO 2007100072 A1 * 9/2007

* cited by examiner

*Primary Examiner* — Basia Ridley
*Assistant Examiner* — Jacob Buchanan
(74) *Attorney, Agent, or Firm* — Cantor Colburn LLP

(57) ABSTRACT

A mounting system for a plurality of battery modules needed to form a battery pack includes a battery tray with a combination of fixed and detachable retainers that enable insertion/removal of individual battery modules from the battery pack, both during assembly of the battery pack and later in conjunction with service during its operation. The battery tray may be disposed on a base plate for added support, as well as integration of more than one battery tray and associated modules into a battery pack. A cover may be added to for additional support and protection of the battery modules. Where multiple battery trays are integrated on a base plate, the battery trays may be oriented on the base plate in different directions. The battery mounting system may be used in a motor vehicle or other applications that use a battery pack.

27 Claims, 9 Drawing Sheets

BATTERY MOUNTING SYSTEM

TECHNICAL FIELD

This invention relates generally to battery mounting systems, and, more particularly, to mounting systems for a plurality of battery modules.

BACKGROUND OF THE INVENTION

Vehicles using fossil fuel, such as gasoline and diesel oil, create exhaust gases which generally include various pollutants. A technology of using storage or secondary batteries, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional combustion engine, have been developed, and some are now being used commercially. Various nickel-metal hydride (NiMH) secondary batteries have been widely used as the power source in EV and HEV applications. More recently, however, the use of lithium-ion secondary batteries has been proposed.

High output and large capacity are needed for such secondary batteries to be used as the power source. For this reason, such batteries are typically constructed from a plurality of smaller battery cells (unit cells) that are interconnected in series or in parallel with each other to form a battery module. A plurality of battery modules is interconnected to obtain a battery pack having the desired output and capacity characteristics.

In order to use battery packs of the type described above in various applications, including applications where the devices which are in power communication with the battery pack are subject to movement, such as, for example, various motorized vehicles, aircraft, watercraft, trains and the like, it is generally desirable to establish a battery mount which may be used to secure the battery pack to the device with which it is in power communication and also secure the battery modules that make up the battery pack with respect to one another. Using a mount to secure the battery pack and modules in the manner described enables electrical interconnection of the battery pack with the devices with which it is in powered communication. In some applications, it is also desirable that the mount provide physical protection for the battery pack, such that the battery modules are covered. While various types of battery mounts for mounting individual batteries are known including certain covered mounts, and such mounts may be used to mount individual battery modules, these individual mounts are generally not desirable for use to mount the plurality of battery modules associated with a battery pack, as they require securing the battery modules individually. Therefore, it is desirable to develop mounting systems for mounting a plurality of battery modules as used in battery packs of the types described above.

SUMMARY OF THE INVENTION

In general terms, this invention provides a battery mounting system for mounting a plurality of battery modules. The invention provides a battery tray that accepts a plurality of battery modules to form a battery pack, while also providing a combination of fixed and detachable retainers that enable insertion of individual battery modules into the battery pack and removal of individual battery modules from the battery pack, both during assembly of the battery pack and later in conjunction with service during the course of its operating life. The battery tray may be disposed on a base plate to provide additional support for the battery tray, as well as enabling the integration of more than one battery tray, as well as the battery modules associated therewith, into a battery pack. Where multiple battery trays are integrated on a base plate, the battery trays may be oriented on the base plate in different directions. The present invention provides a battery mounting system for modular assembly and packaging of battery modules into a battery pack that may be mounted, for example, in a motor vehicle or other applications that require modular battery pack assemblies.

These and other features and advantages of this invention will become more apparent to those skilled in the art from the detailed description of a preferred embodiment. The drawings that accompany the detailed description are described below.

BRIEF DESCRIPTION OF THE DRAWINGS

The following is a brief description of the drawings wherein like elements are numbered alike in the several views.

DETAILED DESCRIPTION OF AN EXEMPLARY EMBODIMENT

In general terms, this invention provides a battery mounting system for mounting a plurality of battery modules. The invention provides a battery tray that accepts a plurality of battery modules to form a battery pack, while also providing a combination of fixed and detachable retainers that enable insertion and retention of individual battery modules into the battery pack and removal of individual battery modules from the battery pack, both during assembly of the battery pack, and later in conjunction with service during the course of its operating life. The battery tray may be disposed on a base plate to provide additional support for the battery tray, as well as enabling the integration of more than one battery tray, as well as the battery modules associated therewith, into a battery pack. Where multiple battery trays are integrated on a base plate, the battery trays may be oriented on the base plate in different directions. The battery mounting system of the present invention provides a system for mounting a modular assembly of battery modules as a battery pack that may be used in various applications including those where the devices which are in power communication with the battery pack are subject to movement, such as, for example, various motorized vehicles, aircraft, watercraft, trains and the like.

Figure 1:
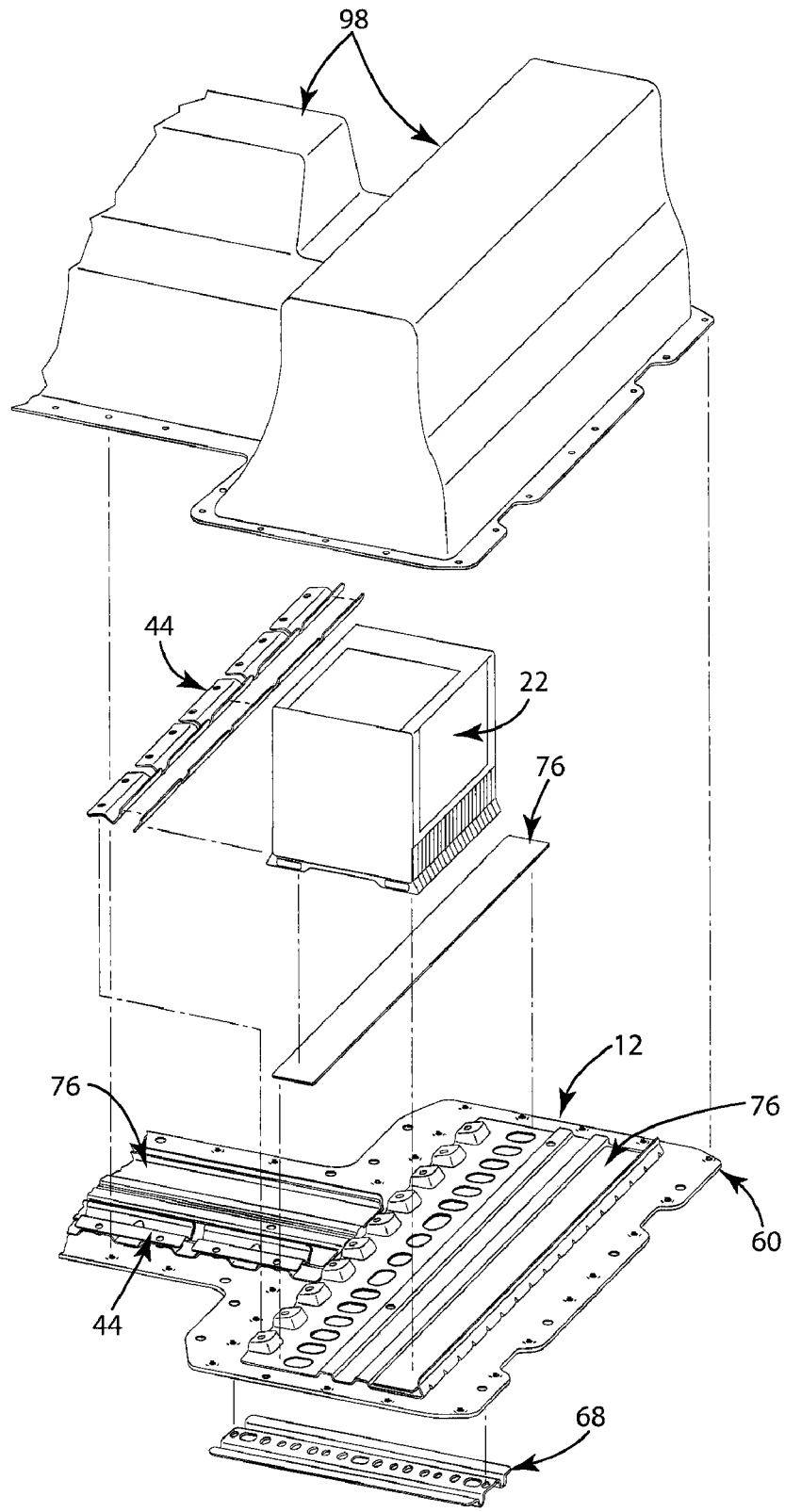
FIG. 1 is an exploded perspective view of an exemplary embodiment of a battery mounting system of the present invention.
Figure 2:
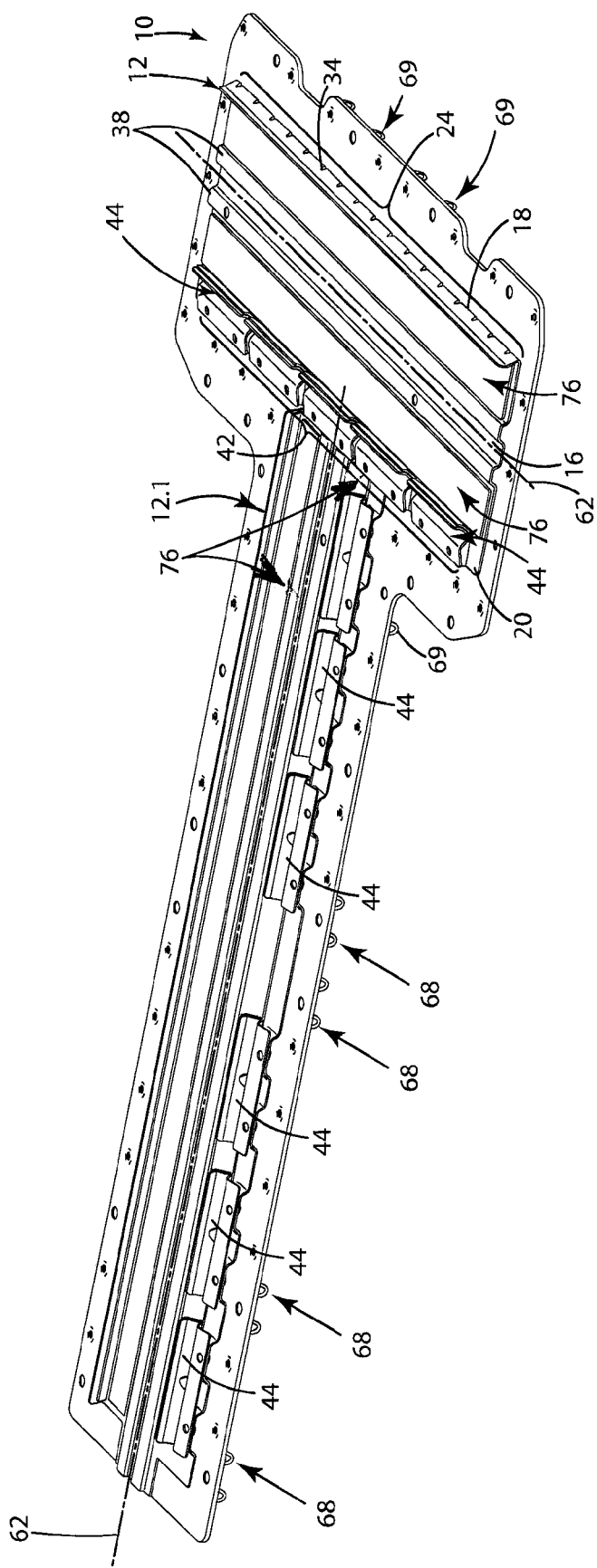
FIG. 2 is a perspective view of an assembly of certain of the components of FIG. 1.

Referring to FIGS. 1-13, an exemplary embodiment of the present invention includes a battery mounting system 10. Referring more particularly to FIGS. 1-6, battery mounting system 10 includes a battery tray 12. As illustrated in FIGS. 1 and 2, battery mounting system 10 may also include more than one battery tray 12, and where more than one battery tray 12 is used, the trays may have the same configuration or they may have different configurations. Battery trays having different configurations are illustrated in FIGS. 1 and 2 by battery tray 12 and battery tray 12.1. Battery tray 12 and battery tray 12.1 have substantially the same features, as explained further below, although they may have different sizes, including different lengths and widths. However, they may each also incorporate distinctive features, such as an extension on battery tray 12.1. Battery tray 12 and battery tray 12.1 each have a base 16, a retainer side 18 and an attachment side 20. Retainer side 18 is opposite attachment side 20 across the width of the battery trays 12, 12.1. Battery tray 12 and battery tray 12.1 each have length such that they are operative to receive a plurality of battery modules 22, as may be understood from FIGS. 10-12, and is illustrated particularly in FIG. 13.

Base 16 provides support for battery modules 22 and particularly is adapted for pressing engagement with module base 36. Base 16 may include strengthening rib 38 which extends lengthwise along base 16. As illustrated in FIGS. 1-5, this may also include a plurality of ribs 38, such as the two ribs 38 shown in these figures. The number of ribs 38, as well as their location, spacing, width and height may be selected so as to provide the required stiffness and strength of base 16 and battery tray 12 along its length. Base 16 may also incorporate one or more cut-outs or openings 40 along its length. Cut-outs 40 are used to reduce the weight of the battery tray, such as battery trays 12, 12.1. Cut-outs 40 will be selected and incorporated, including their number, size, shape, orientation and other factors so as to achieve the required strength characteristics of base 16 and the battery tray while also satisfying design requirements for the weight of the battery tray, such as the minimization of its weight.

Figure 6:
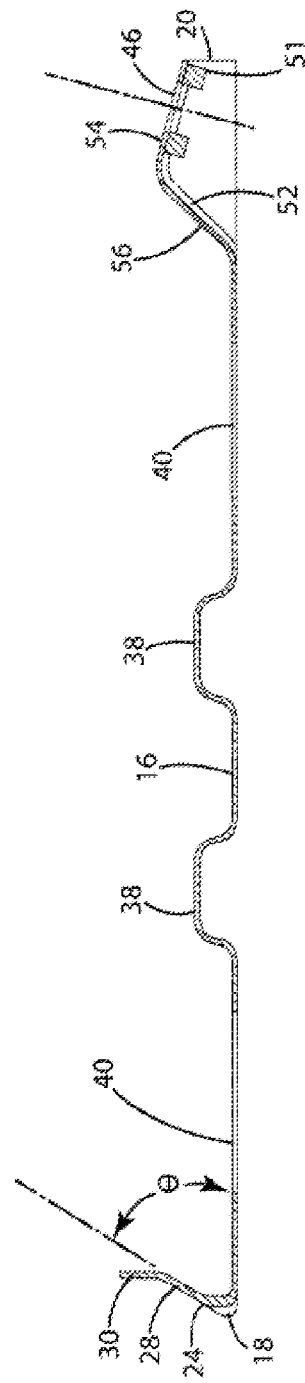
FIG. 6 is a cross-section of the battery tray of FIG. 4 taken along section 6-6.
Figure 10:
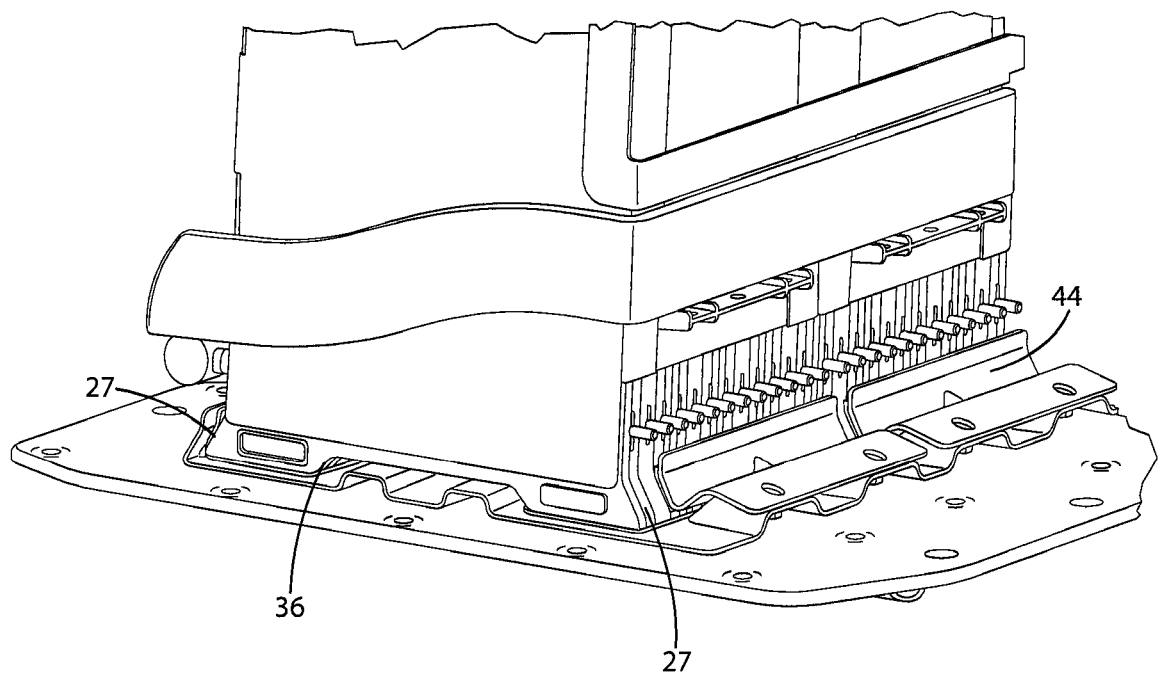
FIG. 10 is a partial perspective view of the mounting system of FIG. 1 with a battery module disposed therein.
Figure 11:
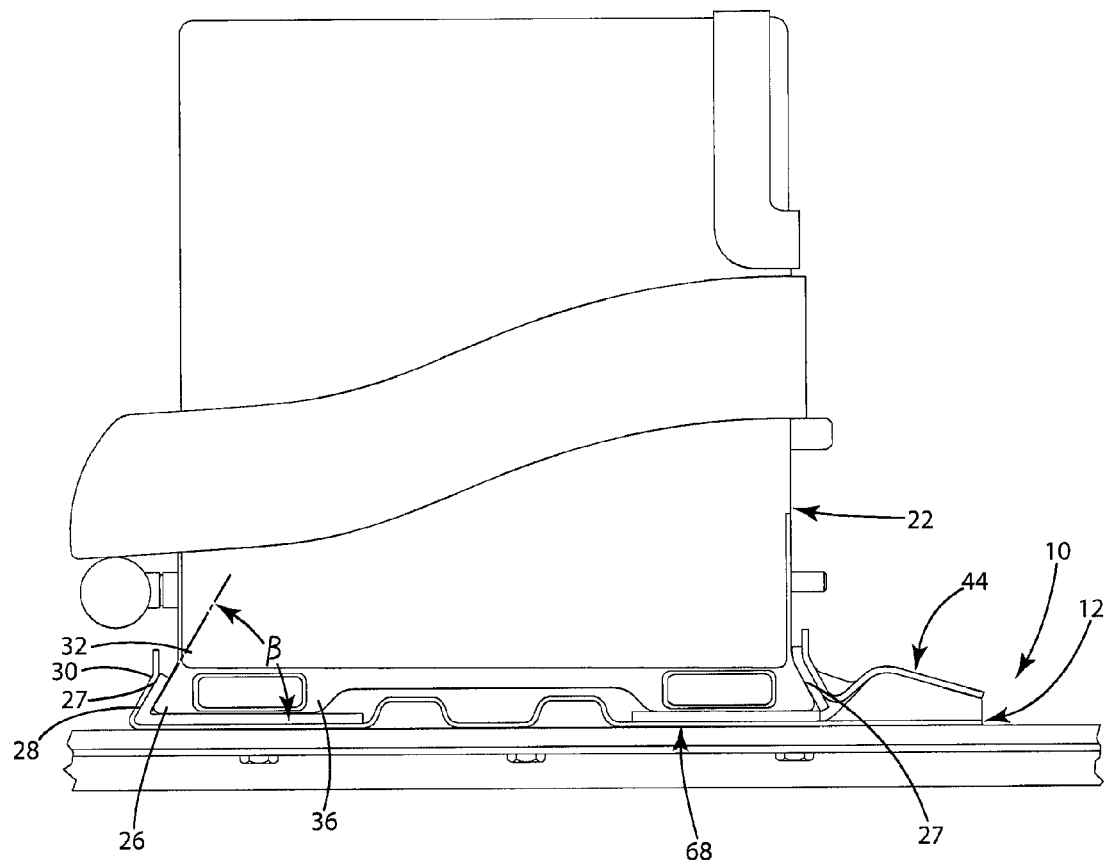
FIG. 11 is a partial end view of the assembly of FIG. 10.
Figure 12:
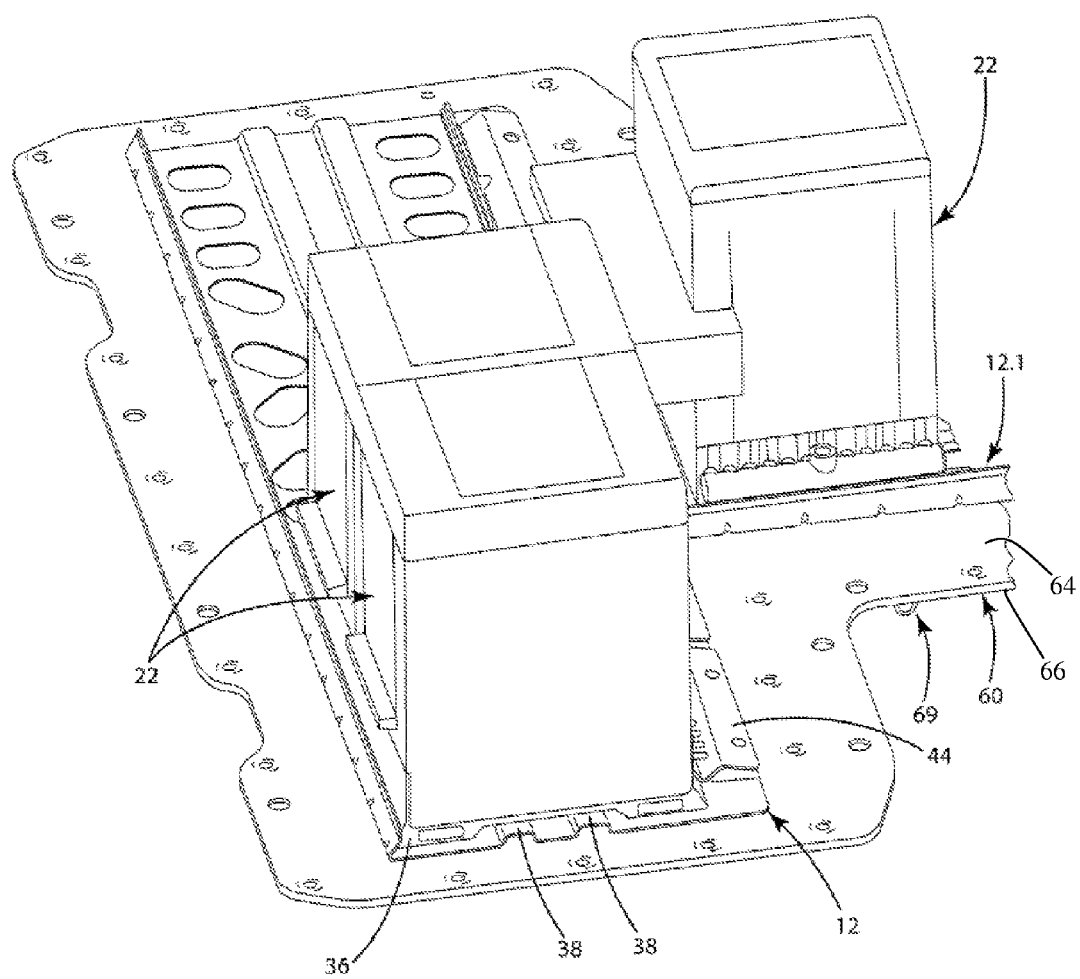
FIG. 12 is a partial perspective view of the mounting system of FIG. 2 with two battery modules disposed therein.

Retainer side 18 has a retainer 24 which extends at least partially along the length of trays 12, 12.1, as illustrated in FIGS. 1-6. As may be seen in FIGS. 1-2, retainer 24 extends along the entire length of battery tray 12, while retainer 24 extends only partially along the length of battery tray 12.1. While in many cases retainer 24 may extend along all or substantially all of the length of the battery tray, it will at a minimum extend at least partially along the length of the battery tray. Retainer 24 is operative to capture a retention feature of the battery module 22, such as one of a pair of opposing tapered flanges 26, as illustrated in FIGS. 10-13. Tapered flanges 26 each may have a retention surface 27 as shown in FIGS. 10-11 operative for bearing engagement with retainer 24. Retainer 24 may have any suitable shape for retaining the retention feature of battery module 22, including an inwardly and upwardly extending tapered wall 28. Tapered wall 28 may preferably be adapted to provide pressing engagement against tapered flange 26. Tapered wall 28 may also be adapted to include a vertical wall portion 30 which is adapted to a vertical wall 32 of battery module 22. As shown in FIG. 6, tapered wall 28 has a taper angle (θ) that is adapted to the taper angle (β) which tapered flange 26 makes with the base of battery module 22, as shown in FIG. 11. Taper angle (θ) may be adapted to match the taper angle (β) of tapered flange 26 so as to provide contact along substantially all of the surface of tapered wall 28, excepting vertical wall portion 30, or taper angle (θ) may be selected so as to establish line contact between tapered flange 26 and tapered wall 28. Taper angle (θ) may be any suitable angle, but generally will be selected to be less than or equal to about 60°, and more particularly less than or equal to about 45°. Thus, the taper angle (β) will generally also be selected to be within this range. Smaller taper angles (β) are advantageous in that they reduce the contact area footprint of battery modules 22, both with regard to the size of battery mounting system 10, as well as shipping and storage of the battery modules 22. Retainer 24 may be incorporated by any suitable method or means. For example, retainer 24 may be formed as tapered wall 28 from an integral sheet used to form the battery tray. However, it is believed that retainer 24 may also be added to base 16 on retainer side 18, such as by welding tapered element to base 16 which includes tapered wall 28; however, such added processes would generally not be expected to be cost competitive with formed retainer 24 structures. As illustrated in FIGS. 1, 2, 4 and 5, retainer 24 may also include a plurality of inwardly projecting retainer gussets 34 located between tapered wall 28 and base 16. Retainer gussets 34 may be incorporated by forming retainer gussets 34 at spaced intervals along tapered wall 28 by deforming associated portions of tapered wall 28, base 16, or both of them. Retainer gussets 34 reinforce tapered wall 28 and make it more resistant to deflection in conjunction with lateral forces and bending moments that may be applied thereto upon installation of battery modules 22, or during use of the battery pack. In this regard, retainer gussets 34 act as a strengthening rib interposed between tapered wall 28 and base 16.

The battery tray also incorporates an attachment structure 42 on attachment side 20. Attachment structure 42 is operative for the detachable attachment of retainer plates 44 (see FIGS. 1, 2 and 7). Attachment structure 42 includes a plurality of spaced bores 46 located along the length of the battery tray on the attachment side 20. Attachment structure 42 is preferably a raised structure to provide sufficient thickness for use of connectors, such as threaded bolts to attach retainer plates 44 to attachment structure 42. This may be accomplished by increasing the thickness of retainer side 20, or by forming attachment side 20 to raise the upper surface 48 of attachment structure 42 sufficiently to enable use of threaded fasteners, while also maintaining a planar lower surface 50 of attachment structure 42, and more generally of the battery tray. This may be accomplished, for example, by the formation of a plurality of raised pockets 52. Raised pockets 52 incorporate spaced bores 46 to provide attachment structure 42. Raised pockets 52 may also incorporate, on lower surface 50 proximate to and in axial alignment with bores 46, a corresponding plurality of welded nuts 51 (see FIG. 6) having threaded bores which are adapted to receive a threaded connector, such as a threaded bolt (not shown) for attachment of retainer plates 44 in the positions shown (for example in FIG. 2). Raised pockets 52 may be formed so that the pockets have respective upper pocket surfaces 54 that taper outwardly and downwardly toward attachment side 20. Front pocket surfaces 56 of raised pockets 52 may also taper downwardly and inwardly toward strengthening ribs 38. Upper surfaces 54 and front surfaces 56 are the attachment surfaces to which lower surfaces 58 of respective retainer plates 44 are attached. The taper angles (i.e., angles from the horizontal) of upper surfaces 54 and front surfaces 56 may be selected so as to cradle and pre-position the retainer plates 44 as they are placed into position, prior to insertion of connectors, such as threaded bolts, for retention of battery modules 22.

The battery tray may be formed from any suitable material, including various ferrous alloys, such as steel. In an exemplary embodiment, battery tray is made from a formable, high-strength steel, such as ASTM 1020. As indicated, the battery tray may have any suitable size, including the length and width, and any suitable thickness. In an exemplary embodiment, battery trays 12,12.1 were made from 1.5 mm thick high-strength steel, ASTM 1020, and was fabricated by stamping to include a retainer 24 having a tapered wall 28, two strengthening ribs 38, cut-outs 40 and attachment structure 42, including a plurality of raised pockets 52, as shown in FIGS. 1-6.

As shown in an exemplary embodiment in FIGS. 1, 2, 10-13, battery mounting system 10 may also include base plate 60. Base plate 60 may be provided to house one or more battery trays, and in the case where more than one battery tray is used, to integrate the respective battery trays. In the case where base plate 60 integrates multiple battery trays, the battery trays may be oriented with their lengths or longitudinal axes 62 oriented in the same direction, or different directions, and if in different directions in as many different directions as there are battery trays. Further, a single battery tray may be constructed in a bent (e.g., intersecting straight sections), curved or other configurations, including various closed shape configurations (e.g., triangular, rectangular, circular, various polyhedrons), such that it has multiple straight sections having more than one longitudinal axis, or axes which extend in different directions, or such that the longitudinal axis is curved. As shown in FIGS. 1, 2, 10-13, base plate 60 is used to house and integrate two battery trays 12, 12.1, and these trays are disposed and oriented such that their longitudinal axes 62 are substantially orthogonal to one another. Base plate 60 has an upper surface 64 and a lower surface 66. Battery trays are disposed on upper surface 64 by attaching the lower surface 50 of battery trays 12,12.1 thereto. The attachment may be accomplished as a detachable attachment, such as by the use of various detachable fasteners (e.g., passing threaded bolts through bores in both the battery trays and base plates together with threaded nuts), or as a fixed attachment by permanently joining the battery trays and base plates together (e.g., using various welds, brazes, adhesives and the like). Base plates may have any suitable size and shape for housing the battery trays. The size and shape may be related to the size, shape and orientation of the battery trays being housed, or may have a different shape. As shown in FIGS. 1 and 2, base plate 60 may have a substantially T-shaped configuration. This configuration is particularly advantageous in various motor vehicle applications, or applications in other types of craft, where the vehicle or other craft is substantially symmetric about a central plane, or where weight distribution about a central line or plane is desirable, because the T-shaped battery mounting system 10 is relatively compact and can be oriented symmetrically about such a central plane, generally by appropriate orientation of longitudinal axis 62 of battery tray 12.1 within the plane. Further, the lateral portion of the T-shaped systems associated with battery tray 12 can be associated with various laterally oriented features of such vehicles or craft, including various laterally oriented bulkheads, such as a vehicle firewall, the front or rear seats and the like.

The base plate may be formed from any suitable material, including various ferrous alloys, such as steel. In an exemplary embodiment, base plate was made from a formable, high-strength steel, such as ASTM 1020. As indicated, the base plate may have any suitable size and shape including the length and width, and any suitable thickness. In an exemplary embodiment, base plate 60 was made from a 1.0 mm thick high-strength steel, ASTM 1020 and was fabricated by stamping, as shown in FIGS. 1 and 2. Battery trays 12,12.1 may be disposed base plate 60 by welding.

Figure 8:
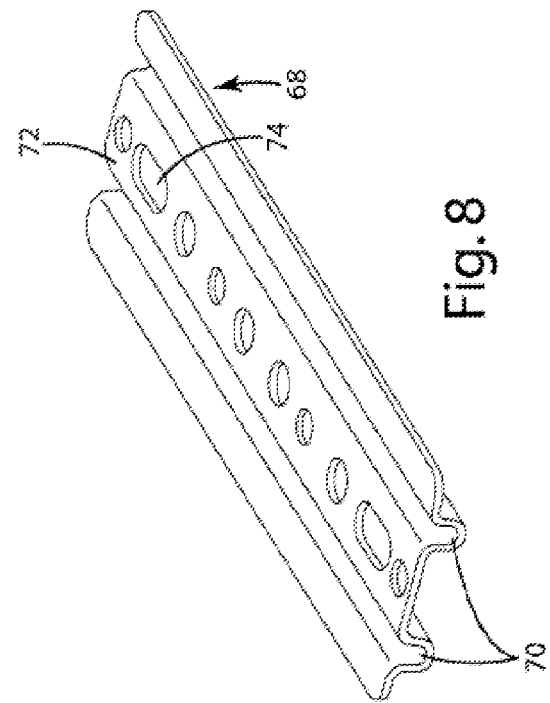
FIG. 8 is a perspective view of an exemplary embodiment of a lateral rib of FIG. 1.
Figure 9:
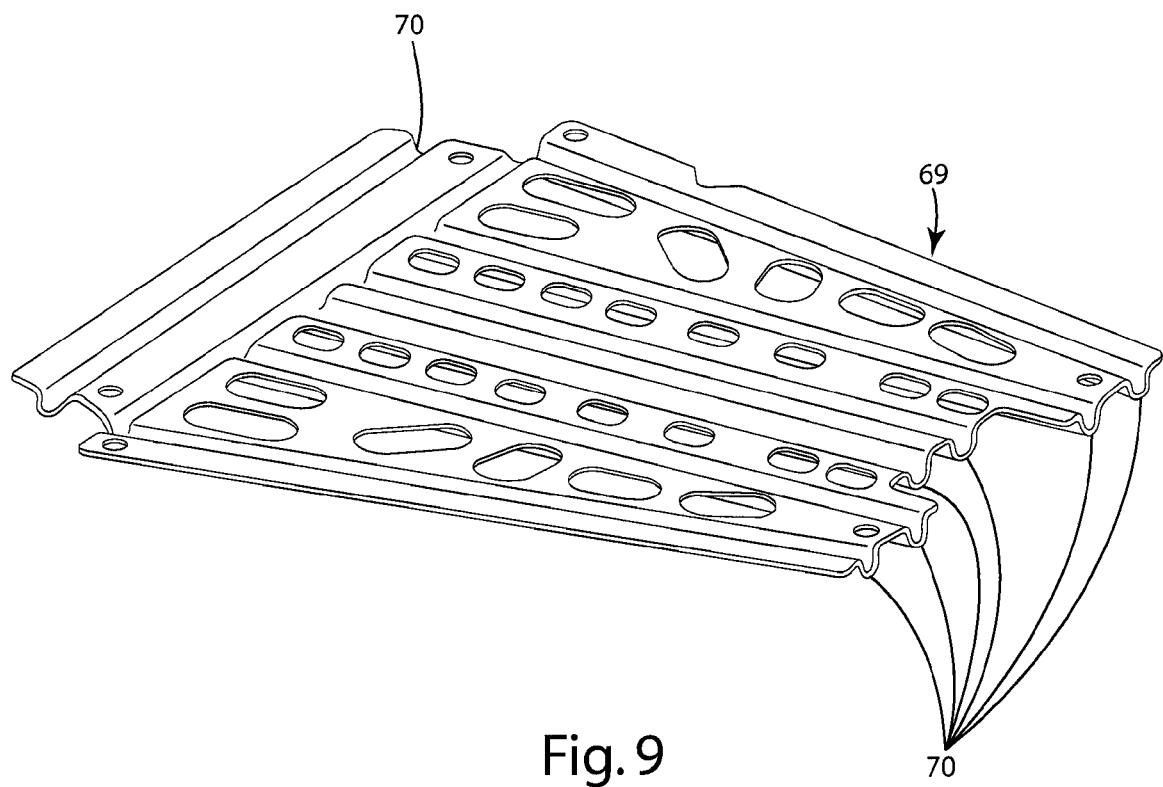
FIG. 9 is a perspective view of another exemplary embodiment of a lateral rib of FIG. 1.

Referring to FIGS. 1, 2 and 8, mounting system 10 may also incorporate one or more lateral ribs 68 disposed on lower surface 66 of base plate 60. Lateral ribs 68 may be incorporated to stiffen and strengthen battery mounting system 10, particularly across the width of battery mounting system 10, and battery trays 12, 12.1. Any suitable number of lateral ribs 68 may be used to provide the desired stiffness to battery mounting system 10 and base plate 60. As shown in FIGS. 1 and 2, five may be incorporated along the length of battery tray 12.1 and two along the length of battery tray 12, with one lateral rib 69 shared between them which provides laterally extending channels 70 with reference to both battery trays, as shown in FIG. 9. Lateral ribs 68 may have any suitable shape to provide stiffening as described above. In an exemplary embodiment, lateral ribs 68 incorporate two channels 70 having an arcuate cross-section formed in a flat sheet 72 by stamping. Lateral ribs 68 also incorporate a plurality of rib cut-outs 74 along their length. Lateral ribs 68 may have any suitable size, including their length and width, but generally will be selected so as to be complimentary to the width of the base plate 60 as indicated herein. It is also believed that all or a portion of the rib structure provided by discrete lateral ribs 68 may be disposed on the base plate 60 by forming this structure directly into base plate 60.

Lateral ribs may be formed from any suitable material, including various ferrous alloys, such as steel. In an exemplary embodiment, lateral ribs are made from formable, high-strength steel, such as ASTM 1030. As indicated, lateral ribs may have any suitable size, including any length and width, and any suitable thickness. In an exemplary embodiment, lateral ribs 68 were made from 1.6 mm thick high-strength steel, ASTM 1030. Lateral ribs 68 were fabricated by stamping to include channel 70 and rib cut-out 74, as shown in FIG. 8. Lateral ribs 68 and 69 may be disposed on base plate 60 by welding.

The base plate, battery trays and lateral ribs may be assembled to form a base plate subassembly in the manner described herein. The base plate subassembly may include a corrosion resistant and electrically insulating coating, such as a powder coat.

Figure 3:
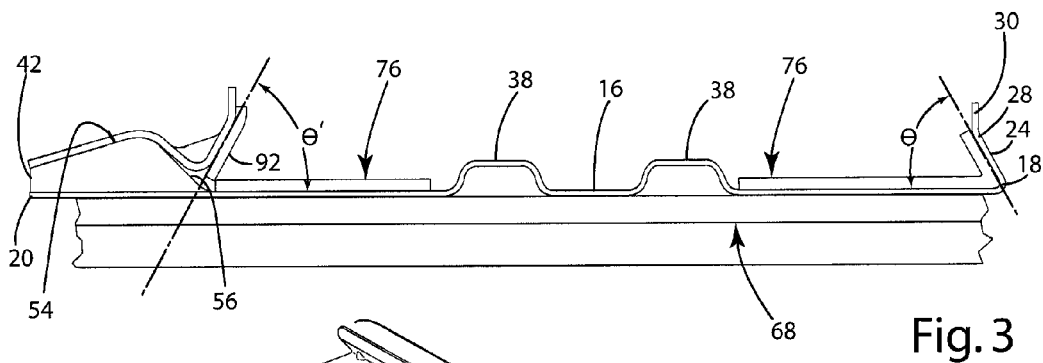
FIG. 3 is a partial front view of the assembly of FIG. 2.
Figure 4:
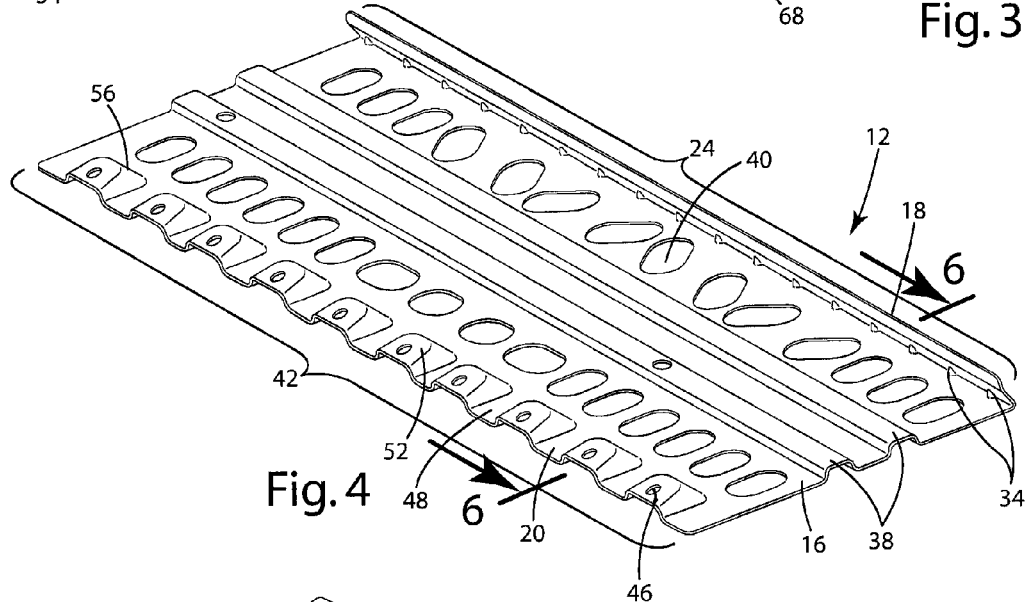
FIG. 4 is a top perspective view of the battery tray of FIG. 1.
Figure 5:
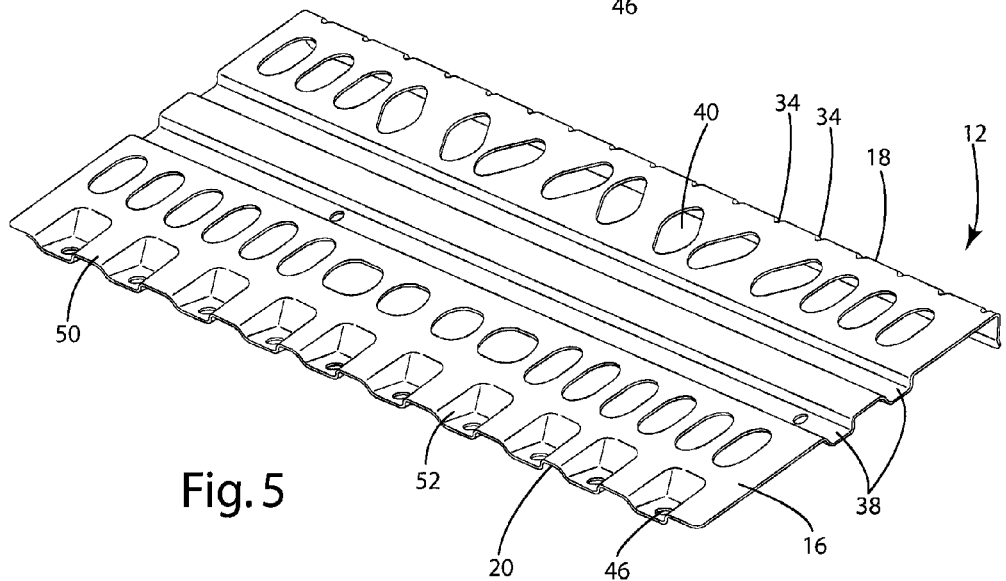
FIG. 5 is a bottom perspective view of the battery tray of FIG. 1.

Referring to FIGS. 1-3, battery mounting system 10 may also incorporate a resilient sheet. Resilient sheet 76 is operative as a vibration dampening element to reduce the tendency for vibration to be exchanged between battery mounting system 10 and battery modules 22 mounted thereon. Resilient sheet 76 may comprise a plurality of resilient sheets 76 disposed on upper surface 48 of the battery tray, such as battery trays 12, 12.1. Resilient sheets 76 are preferably disposed on upper surface 48 between strengthening rib or ribs 38 and retainer 24 on one side and attachment structure 42 on the other side of the battery tray. Resilient sheets 76 will generally extend at least partially along the length of the battery tray and may extend along substantially the entire length of the battery tray as shown in FIGS. 1-3. Resilient sheets 76 may have any suitable size, including their length and width, shape and thickness. These aspects of resilient sheets 76 will generally be selected in conjunction with the overall size and shape of battery mounting system 10 as well as battery modules 22.

Resilient sheet 76 may be formed from any suitable material, including various elastomers, such as natural or synthetic rubber, silicone and the like. In an exemplary embodiment, resilient sheets 76 were made from synthetic rubber. As indicated, resilient sheets may have any suitable size, including length and width, and any suitable thickness. In an exemplary embodiment, resilient sheets were made from 1-3 mm thick synthetic rubber and was fabricated by excising the rectangular forms shown larger pre-formed sheet of this material. Resilient sheets 76 may be attached to battery trays using a suitable adhesive.

Battery mounting system 10 may also incorporate one or more retainer plates 44 for clamping a battery module or portion thereof. In an exemplary embodiment, a plurality of retainer plates 44 was used, as illustrated in FIGS. 1-3 and 7. Retainer plates 44 each have a clamp retainer end 78 and a clamp attachment end 80. The clamp retainer end 78 has a clamp retainer 82. Clamp retainer 82 is operative to capture a retention feature of battery modules 22, such as one of a pair of opposing tapered flanges 26, as illustrated in FIGS. 10-13. Tapered flanges 26 each may have a retention surface 27 as shown in FIGS. 10-11 operative for bearing engagement with clamp retainer 82. Clamp retainer 82 may have any suitable shape for retaining the retention feature of battery module 22, including an inwardly and upwardly extending clamp tapered wall 94. Clamp tapered wall 94 may preferably be adapted to provide pressing engagement against tapered flange 26. Clamp tapered wall 94 may also be adapted to include a clamp vertical wall portion 96 which is adapted to a vertical wall 32 of battery module 22. As shown in FIG. 6, clamp tapered wall 94 has a taper angle that is developed in conjunction with the inclination of upper surface 54 to yield an installed taper angle ($\theta'$) that is adapted to the taper angle ($\beta$) which tapered flange 26 makes with the base of battery module 22, as shown in FIG. 11. Installed taper angle ($\theta'$) may be adapted to match the taper angle ($\beta$) of tapered flange 26 so as to provide contact along substantially all of the surface of clamp tapered wall 94, excepting vertical wall portion 96, or installed taper angle ($\theta'$) may be selected so as to establish line contact between tapered flange 26 and tapered wall 28. Installed taper angle ($\theta'$) may be any suitable angle, but generally will be selected to be less than or equal to about 60°, and more particularly less than or equal to about 45°. Thus, the taper angle ($\beta$) will generally also be selected to be within this range. Clamp retainer 82 is formed as a substantially v-shaped recess 84 in the plate structure that comprises retainer plate 44. Within v-shaped recess 84, one or more inwardly protruding clamp gussets 86 may be formed. Clamp gussets 86 provide additional stiffness and strength to clamp retainer 82 as clamp retainer 82 is placed in contact with and provides pressing engagement to tapered flange 26 of battery module 22. Clamp retainer 82 may be incorporated by any suitable method or means. For example, clamp retainer 82 may be formed as v-shaped recess from an integral sheet used to form the retainer plate 44. Clamp attachment ends 80 of retainer plate 44 each incorporate a clamp attachment structure 87. Clamp attachment structure may include a plurality of clamp bores 88, such as the two such bores shown in FIG. 7. Clamp bores 88 are operative to receive a corresponding plurality of connectors (not shown) for insertion through clamp bores 88 and attachment to attachment structure 42 in the manner described herein. This may include a plurality of threaded bolts (not shown) as the connectors which are threaded into attachment structure 42 such as the plurality of welded nuts 51 described above associated with attachment structure 42. Threaded bolts may be inserted in the manner described and tightened against an upper clamp surface 90 to cause clamp retainer 82 to provide bearing pressure against retention surface 27 of battery module 22. This clamping pressure is used to retain battery module 22 to battery trays 12, 12.1. A plurality of retainer plates 44 may be employed with each battery module 22. Clamp resilient sheet 92 may be disposed on the clamp tapered wall 94 of retainer plate 44. Clamp resilient sheet 92 provides vibration damping in a manner similar to that described above with regard to resilient sheet 76. It may be disposed on the clamp tapered wall 94 by an adhesive. For a given battery mounting system 10, retainer plates 44 may be identical, or they may be different, for example, to accommodate different battery trays adapted to house battery modules having different configurations.

Figure 7:
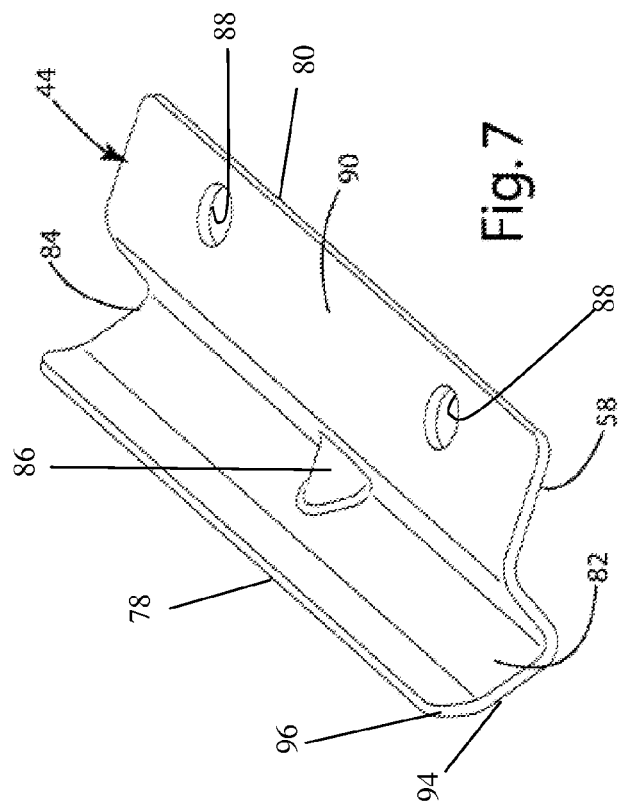
FIG. 7 is a top perspective view of a battery clamp of FIG. 1.

Retainer plates may be formed from any suitable material, including various ferrous alloys, such as steel. In an exemplary embodiment, retainer plates are made from formable, high-strength steel, such as ASTM 1020. As indicated, retainer plates may have any suitable size, including any length and width, and any suitable thickness. In an exemplary embodiment, lateral ribs 68 were made from 2 mm thick high-strength steel, ASTM 1030. Retainer plates 44 were fabricated by stamping to include clamp gusset 86 and clamp bores 88, as shown in FIG. 7. Retainer plates may include a corrosion resistant and electrically insulating coating, such as a powder coat.

Figure 13:
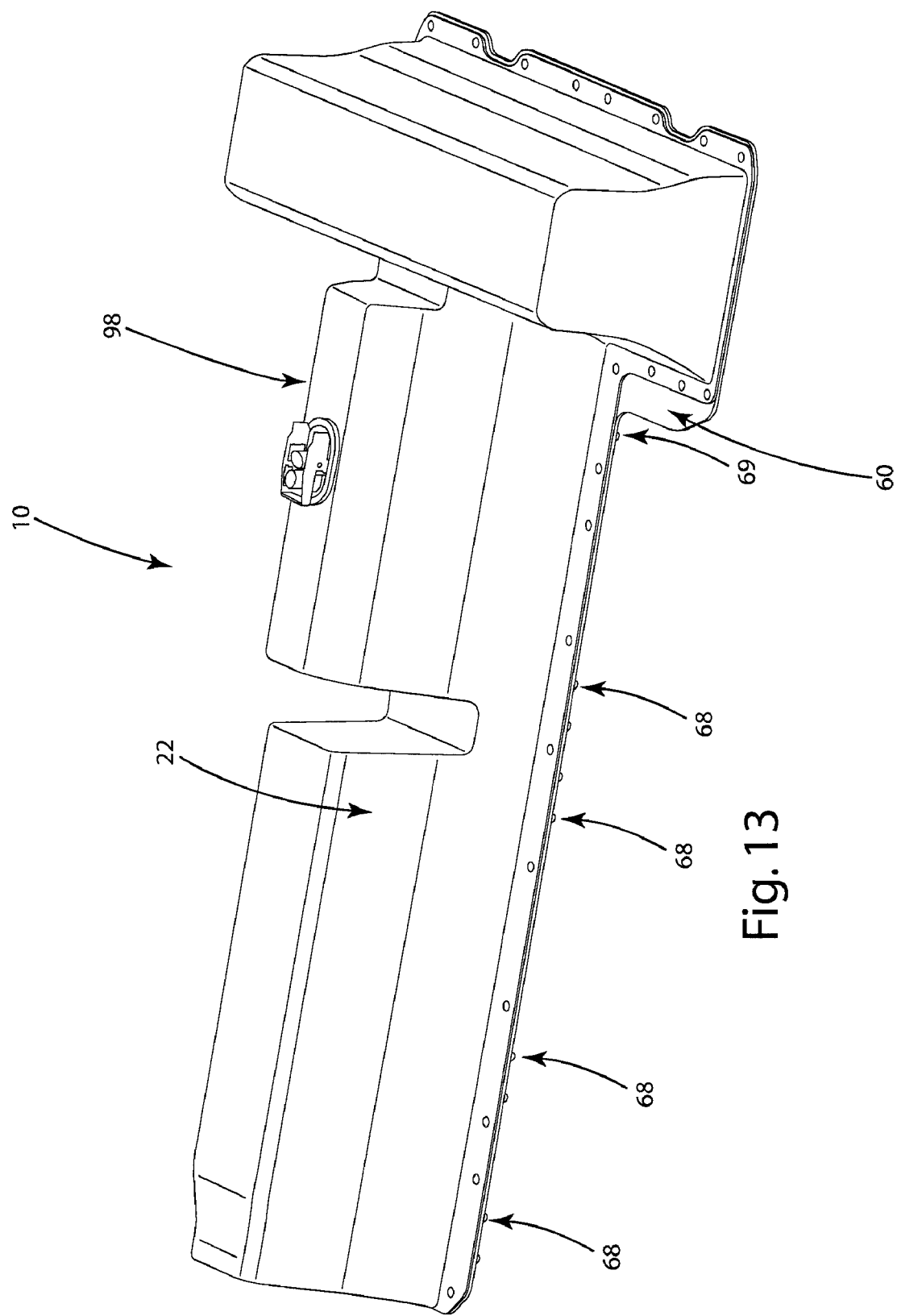
FIG. 13 is a perspective view of an assembly of the components of FIG. 1 illustrating a plurality of battery modules disposed therein.

Battery mounting system 10 may also incorporate a cover 98, as shown in FIGS. 1 and 13. Cover 98 has an internal cavity that is adapted to house a plurality of battery modules 22 as shown in FIG. 13 and cover substantially all of the surface of base plate 60, including the battery trays. Cover is disposed on base plate 60, and preferably is detachably attached to base plate 60 with a plurality of fasteners, such as threaded bolts and associated threaded nuts. Detachable attachment permits cover 98 to be fixed to base plate 60 during the manufacture and use of the battery pack, but permits removal and replacement of the individual battery modules upon its detachment. Cover 98 may be made of materials of sufficient strength to permit cover 98 to act as a strengthening structural member of battery mounting system 10 as well as a protective cover for battery modules 22.

Cover 98 may be formed from any suitable material, including various engineering thermoplastics and reinforced composites thereof. In an exemplary embodiment, cover 98 was made from a sheet molding compound (SMC) comprising a vinyl ester. As indicated, battery clamps may have any suitable size, including any length and width, and any suitable thickness.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A battery mounting system, comprising:
   a battery tray having a base, a retainer side and an attachment side opposed across a width thereof, the battery tray having a length operative to receive a plurality of battery modules, the retainer side having a retainer extending at least partially along a length of the tray, the attachment side having an attachment structure extending at least partially along the length of the tray, the retainer operative to engage a first retention surface associated with each of the plurality of battery modules;

the attachment structure comprising a plurality of spaced bores that are located in a raised portion of the attachment structure, the raised portion comprising a plurality of raised pockets and the bores are associated with the pockets.

2. The battery mounting system of claim 1, wherein the retainer comprises an inwardly and upwardly extending tapered wall having a taper angle.

3. The battery mounting system of claim 2, wherein the retainer also comprises a plurality of spaced gussets joining the tapered wall and the base along the length of the battery tray.

4. The battery mounting system of claim 1, wherein the battery tray has a rib extending lengthwise along the base.

5. The battery mounting system of claim 1, wherein the base has a plurality of spaced cut-outs located along the length.

6. The battery mounting system of claim 1, wherein each of the pockets has an upper surface that tapers outwardly and downwardly toward the attachment side.

7. The battery mounting system of claim 1 further comprising a base plate having an upper surface and a lower surface, wherein a lower surface of the battery tray is disposed on the upper surface of the base plate.

8. The battery mounting system of claim 7, further comprising a plurality of lateral ribs disposed on the lower surface of the base plate.

9. The battery mounting system of claim 1, further comprising a cover operative to be disposed on the upper surface of the base plate and enclose the plurality of battery modules.

10. The battery mounting system of claim 1, further comprising a resilient sheet attached to an upper surface of the battery tray.

11. The battery mounting system of claim 1, further comprising a plurality of resilient sheets disposed on an upper surface of the battery tray, wherein a first resilient sheet is disposed proximate the retainer at least partially along a length of the first resilient sheet and a second sheet is disposed proximate the attachment structure at least partially along a length of the second sheet.

12. The battery mounting system of claim 11, wherein the retainer comprises an inwardly and upwardly extending tapered wall, and the first resilient sheet is disposed on the tapered wall.

13. The battery mounting system of claim 1, further comprising a plurality of retainer plates each having a retainer end and an attachment end, the retainer end having a clamp retainer and the attachment end having an clamp attachment structure, the clamp attachment structure operative for detachable attachment to the attachment structure of the battery tray through a connector.

14. The battery mounting system of claim 13, wherein the clamp retainer comprises an inwardly and upwardly extending tapered wall having a taper angle.

15. The battery mounting system of claim 2, further comprising a plurality of retainer plates each having a retainer end and an attachment end, each retainer end having a clamp retainer and each clamp attachment end having a clamp attachment structure, each clamp attachment structure operative for detachable attachment to the attachment structure of the battery tray through a connector.

16. The battery mounting system of claim 15, wherein the clamp retainer comprises an inwardly and upwardly extending clamp tapered wall having an installed taper angle.

17. The battery mounting system of claim 16, wherein the taper angle and the installed taper angle are the same.

18. The battery mounting system of claim 15, further comprising a resilient sheet disposed on the clamp tapered wall.

19. A battery mounting system, comprising:
a battery tray having a base, a retainer side and an attachment side opposed across a width thereof, the battery tray having a length operative to receive a plurality of battery modules, the retainer side having a retainer extending at least partially along the length of the tray, the attachment side having an attachment structure extending at least partially along the length of the tray, the retainer operative to engage a first retention surface associated with each of the plurality of battery modules, the battery tray having at least one strengthening rib extending longitudinally along the battery tray, the at least one strengthening rib being disposed between the retainer side and the attachment side, the battery tray further having a plurality of openings extending therethrough that are disposed between the at least one strengthening rib and the retainer side, the battery tray further having a plurality of openings extending therethrough that are disposed between the at least one strengthening rib and the attachment side;
a base plate having an upper surface and a lower surface, wherein a lower surface of the battery tray is disposed on the upper surface of the base plate; and
a plurality of retainer plates each having a clamp retainer end and a clamp attachment end, the clamp retainer end having a clamp retainer operative to engage a second retention surface associated with each of the plurality of battery modules.

20. The battery mounting system of claim 19, further comprising a cover operative to be disposed on the upper surface of the base plate and enclose the plurality of battery modules.

21. The battery mounting system of claim 19, further comprising a resilient sheet attached to an upper surface of the battery tray.

22. The battery mounting system of claim 19, further comprising a plurality of lateral ribs disposed on the lower surface of the base plate.

23. The battery mounting system of claim 19, wherein the retainer comprises an inwardly and upwardly extending tapered wall having a first taper angle and the clamp retainer comprises an inwardly and upwardly extending tapered wall having a second taper angle.

24. The battery mounting system of claim 19, further comprising a corrosion resistant and electrically insulating coating applied to exposed portions of the battery tray, the base plate and the plurality of retainer plates.

25. The battery mounting system of claim 19, wherein the base plate has a T-shape.

26. The battery mounting system of claim 19, wherein the plurality of openings extending through the battery tray that are disposed between the at least one strengthening rib and the retainer side have a plurality of sizes and a plurality of shapes.

27. The battery mounting system of claim 19, wherein the plurality of openings extending through the battery tray that are disposed between the at least one strengthening rib and the attachment side have a plurality of sizes and a plurality of shapes.

* * * * *